US008700718B2

(12) United States Patent
Walsh et al.

(10) Patent No.: US 8,700,718 B2
(45) Date of Patent: Apr. 15, 2014

(54) PROACTIVE PRE-PROVISIONING FOR A CONTENT SHARING SESSION (75) Inventors: Richard J. Walsh, Raleigh, NC (US); Alfredo C. Issa, Apex, NC (US)

(73) Assignee: Oto Technologies, LLC, Raleigh, NC (US)

( * ) Notice: Subject to any disclaimer, the term of this patent is extended or adjusted under 35 U.S.C. 154(b) by 97 days.

(21) Appl. No.: 13/100,721

(22) Filed: May 4, 2011

(65) Prior Publication Data

US 2011/0208868 A1 Aug. 25, 2011

Related U.S. Application Data (63) Continuation of application No. 12/686,449, filed on Jan. 13, 2010, now abandoned.

(51) Int. Cl.
G06F 15/16 (2006.01)
(52) U.S. Cl.
USPC .......................................... 709/206; 709/204
(58) Field of Classification Search
USPC ........................... 705/319; 709/206; 707/608
See application file for complete search history.

(56) References Cited

U.S. PATENT DOCUMENTS

| | | | |
|---|---|---|---|
| 6,785,704 B1 | 8/2004 | McCanne | |
| 7,690,042 B2 | 3/2010 | Rantalahti | |
| 2002/0087632 A1 | 7/2002 | Keskar | |
| 2004/0002348 A1 | 1/2004 | Fraccaroli | |
| 2004/0093392 A1 | 5/2004 | Nagamatsu et al. | |
| 2004/0213283 A1 | 10/2004 | Ohkubo et al. | |
| 2005/0223010 A1 | 10/2005 | Murray | |
| 2006/0271281 A1 | 11/2006 | Ahn et al. | |
| 2007/0055765 A1 | 3/2007 | Lisiecki et al. | |
| 2007/0162434 A1 | 7/2007 | Alessi et al. | |
| 2007/0288386 A1 | 12/2007 | Adachi et al. | |
| 2008/0005113 A1 | 1/2008 | Li | |
| 2008/0034435 A1 | 2/2008 | Grabarnik et al. | |
| 2008/0052279 A1 | 2/2008 | Marolia et al. | |
| 2008/0080392 A1 | 4/2008 | Walsh et al. | |
| 2008/0091796 A1 | 4/2008 | Story et al. | |
| 2009/0055257 A1 | 2/2009 | Chien et al. | |

(Continued)

OTHER PUBLICATIONS

Kara, Hayat et al., "A Caching Architecture for Content Delivery to Mobile Devices," Proceedings of the 29th EUROMICRO Conference—"New Waves in System Architecture," copyright 2003, IEEE, 8 pages.

(Continued)

Primary Examiner — Bunjob Jaroenchonwanit
(74) Attorney, Agent, or Firm — Withrow & Terranova, PLLC (57) ABSTRACT An apparatus includes a communication interface and a controller associated with the communication interface where the controller is further configured to determine an affinity between a first device and at least one other device and create, based at least in part upon the determined affinity, one or more pre-provision packages. These pre-provision packages include data likely to be shared in the event that a content sharing session is ultimately entered into. The one or more pre-provision packages are then provided for storage upon at least one of the first device and the at least one other device. Then, when a request from the first device to engage in a content sharing session with the at least one other device is received, access to the one or more pre-provision packages is provided to at least one of the first device and the at least one other device.

25 Claims, 4 Drawing Sheets

(56) References Cited

U.S. PATENT DOCUMENTS

| | | |
|---|---|---|
| 2009/0077061 A1 | 3/2009 | Abercrombie, III et al. |
| 2009/0100128 A1 | 4/2009 | Czechowski, III et al. |
| 2009/0143056 A1 | 6/2009 | Tang et al. |
| 2009/0165080 A1 | 6/2009 | Fahn et al. |
| 2009/0172554 A1 | 7/2009 | Subbian et al. |
| 2009/0198833 A1 | 8/2009 | Kisel et al. |
| 2009/0234902 A1 | 9/2009 | Pilosof |
| 2009/0298514 A1 | 12/2009 | Ullah |
| 2009/0307361 A1 | 12/2009 | Issa et al. |
| 2010/0080361 A1 | 4/2010 | Houghton |
| 2010/0287050 A1 | 11/2010 | Jones et al. |

OTHER PUBLICATIONS

Yang, Guang et al., "Social Proximity Networks on Cruise Ships," Proceedings of the Mobile Interaction with the Real World Workshop 2008 (MIRW'08, in conjunction with MobileHCI 2008), Amsterdam, The Netherlands, 2008, 4 pages.

Non-Final Rejection mailed May 24, 2010, for U.S. Appl. No. 12/686,449.

Final Rejection mailed Aug. 3, 2010, for U.S. Appl. No. 12/686,449.

Advisory Action mailed Oct. 13, 2010, for U.S. Appl. No. 12/686,449.

Non-Final Rejection mailed Nov. 23, 2010, for U.S. Appl. No. 12/686,449.

Final Rejection mailed Feb. 4, 2011, for U.S. Appl. No. 12/686,449.

PROACTIVE PRE-PROVISIONING FOR A CONTENT SHARING SESSION

CROSS-REFERENCE TO RELATED APPLICATION

This application claims priority to and is a continuation of co-pending U.S. patent application Ser. No. 12/686,449, entitled "PROACTIVE PRE-PROVISIONING FOR A CONTENT SHARING SESSION," which was filed on Jan. 13, 2010, and the disclosure of which is hereby incorporated herein by reference in its entirety.

FIELD OF THE INVENTION

The present disclosure relates to an apparatus and system for accelerating sharing of content data via proactive pre-provisioning of content data.

BACKGROUND OF THE INVENTION

Mobile device content sharing sessions follow the general pattern of discovery, creation, metadata exchange, and then content exchange. Specifically, the metadata and content exchanges occur after the creation of a content sharing session. In instances where the metadata and content are voluminous in nature, there is often an extended period of time after a content sharing session is established and before the desired shared data is exchanged. There is a need to reduce the time and resource overhead involved in the exchange of metadata and content associated with a content sharing session.

SUMMARY OF THE INVENTION

An apparatus and system directed to accelerating the sharing of content data via proactive pre-provisioning are provided. In accordance with an exemplary embodiment, an apparatus comprises a communication interface and a controller associated with the communication interface where the controller is further configured to determine an affinity between a first device and at least one other device and create, based at least in part upon the determined affinity, one or more pre-provision packages each comprising data associated with one or more of the first device and the at least one other device. These pre-provision packages include data that is likely to be shared in the event that a content sharing session is ultimately entered into between the first device and the at least one other device. The one or more pre-provision packages are then provided for storage upon at least one of the first device and the at least one other device. Then, when an indication of a desire for the first device to engage in a content sharing session with the at least one other device is received, access to the one or more pre-provision packages is provided to at least one of the first device and the at least one other device.

In accordance with another exemplary embodiment, a computer readable medium embodied in an article of manufacture is encoded with instructions for directing a processor to configure a device to engage in a content sharing session. Once configured, the processor operates to sign on to a content sharing service (CSS) and receive one or more pre-provision packages from the CSS. The device then transmits a content sharing request message to the CSS indicative of a desire to engage in a content sharing session with another device. In response to the content sharing request message, information required to access the one or more pre-provision packages is received from the CSS.

In accordance with another exemplary embodiment, a content sharing system comprises a processor, communicatively coupled to at least a first device and at least one other device, for performing instructions embodied in a computer readable medium. The instructions direct the processor to determine an affinity between the first device and the at least one other device. This affinity can be used as an indication of the likelihood that the first device and the at least one other device will ultimately engage in a content sharing session. Next, one or more pre-provision packages are created, based at least in part upon the determined affinity, each comprising data associated with at least one of the first device and the at least one other device. The pre-provision packages are provided for storage upon at least one of the first device and the at least one other device. Then, when an indication of a desire for the first device to engage in a content sharing session with the at least one other device is received, at least one of the first device and the at least one other device are provided access to the one or more pre-provision packages stored thereupon.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In accordance with exemplary and non-limiting embodiments discussed below, there is disclosed a system and various methods by which a content sharing session between two or more devices can be accelerated through proactive pre-distribution of content and content sharing metadata. A content sharing service (CSS) that executes, for example, in a cloud computing environment, via a wireless carrier network, and/or on a mobile device determines an affinity of a first mobile device with a second mobile device based, in part, upon an attribute associated with the mobile devices such as location, social network information, and the like. CSS packages, relevant content data, and content sharing metadata associated with the first mobile device in a secure, protected fashion provide the CSS packages to the second mobile device. At some later time, when a content sharing session is initiated between the first mobile device and the second mobile device, the second mobile device is granted access to the CSS protected package, thereby quickly enabling the content sharing session.

As used herein, "pre-provisioning" refers to an exchange of data between a first device associated with a first user and a second device associated with a second user, wherein the data is exchanged prior to the first and second users consenting to a content sharing session. The exchange data may include, but is not limited to, content, content sharing metadata, and credentials necessary to facilitate a content sharing session. As used herein, "content" refers to digitally encoded files describing any and all forms of data including, but not limited to, audio files, image files, digital objects, and data files.

As used herein, the terms "user" and "device" may be used interchangeably when a device is operated by a user or is otherwise associated with a user. For example, a file sharing session between a first user and a second user involves sharing data between a first device operated by the first user and a second device operated by a second user. In such an instance, one may refer to the content sharing session as between the first user and the second user, between the first device and the second device, or some combination of the two. Unless otherwise stated, any reference to sending data to or receiving data from a user is to be interpreted as sending data to and receiving data from a device operated by the user. Further, the terms "mobile device" and "device" may be used interchangeably when the device described is a mobile device such as a mobile phone, a personal digital assistant (PDA), an eReader, a handheld gaming device, and the like. As used herein, the term "candidate device" refers to a device that is being evaluated as a possible device to engage in a content sharing session.

The following example describes a non-limiting embodiment whereby a CSS facilitates pre-provisioning of content data and content sharing metadata between exemplary users Alice, Bob, and Mary. Alice is at college walking through the campus on her way to Biology 101 at 10 am. Alice's friend Bob is having a snack at a cafeteria that is in proximity to Alice's route. Alice's mobile phone is associated with a CSS that detects that Alice is approaching a person in her social network (Bob) with whom she has shared content before. The CSS further detects some pictures previously taken by Bob that have been shared with and currently reside upon Alice's mobile device. Based in part upon the preceding detections, the CSS determines there to be a requisite affinity between Alice and Bob sufficient to merit pre-provisioning. As a result of the determined affinity, the CSS commences to incrementally pre-provision both Alice's mobile device and Bob's mobile device with content, content sharing metadata, and credentials necessary to facilitate a content sharing session. As Alice travels closer to Bob, the CSS pre-provisions increasingly more data as the mobile devices get closer to each other. For example, when Alice is one kilometer away from Bob, the CSS securely packages each of Alice's and Bob's mobile device information and user profile information to the other's mobile device such that preparation for a content sharing session is complete when Alice is ten meters away from Bob.

In the present example, at a distance of one kilometer, approximately 25% of the data to be eventually pre-provisioned is pre-provisioned. When Alice is 500 meters from Bob, approximately 50% of the data to be eventually pre-provisioned is pre-provisioned. When Alice is 100 meters from Bob, approximately 75% of the data to be eventually pre-provisioned is pre-provisioned. Because Alice's increasing proximity to Bob indicates a greater likelihood that Alice will engage in a content sharing session with Bob, the CSS enacts operations that are more resource/computationally complex. For example, the CSS issues and securely packages Kerberos tickets to each of Alice's and Bob's mobile devices such that the mobile devices are authenticated with each other prior to Alice meeting Bob. Finally, when Alice is ten meters from Bob, approximately 100% of the data to be eventually pre-provisioned is pre-provisioned.

When Alice walks into the cafeteria to get some water she sees her friend Bob. Alice wants to show Bob the pictures from the party last night so she executes a content sharing application resident on her mobile device and selects to share the content with Bob. In response, Bob clicks to "accept" Alice's invitation that was sent to his mobile device and the CSS sends both mobile devices a key to unlock the pre-provisioned packages of content, content sharing metadata, and credentials.

A content sharing client application on the mobile devices unlocks the pre-provisioned packages and loads the data such that both Bob and Alice have instant access to the collections of content. Alice shows Bob pictures of him dancing around with a big orange letter "T" painted on his chest.

As Alice leaves the cafeteria and heads to class, the CSS detects that Alice is approaching her friend Mary. In this example, the CSS determines not to prepare for a potential content sharing session between Alice and Mary because Mary's content sharing history indicates that she does not participate in content sharing sessions around this time and location (e.g. around class time).

Figure 1:
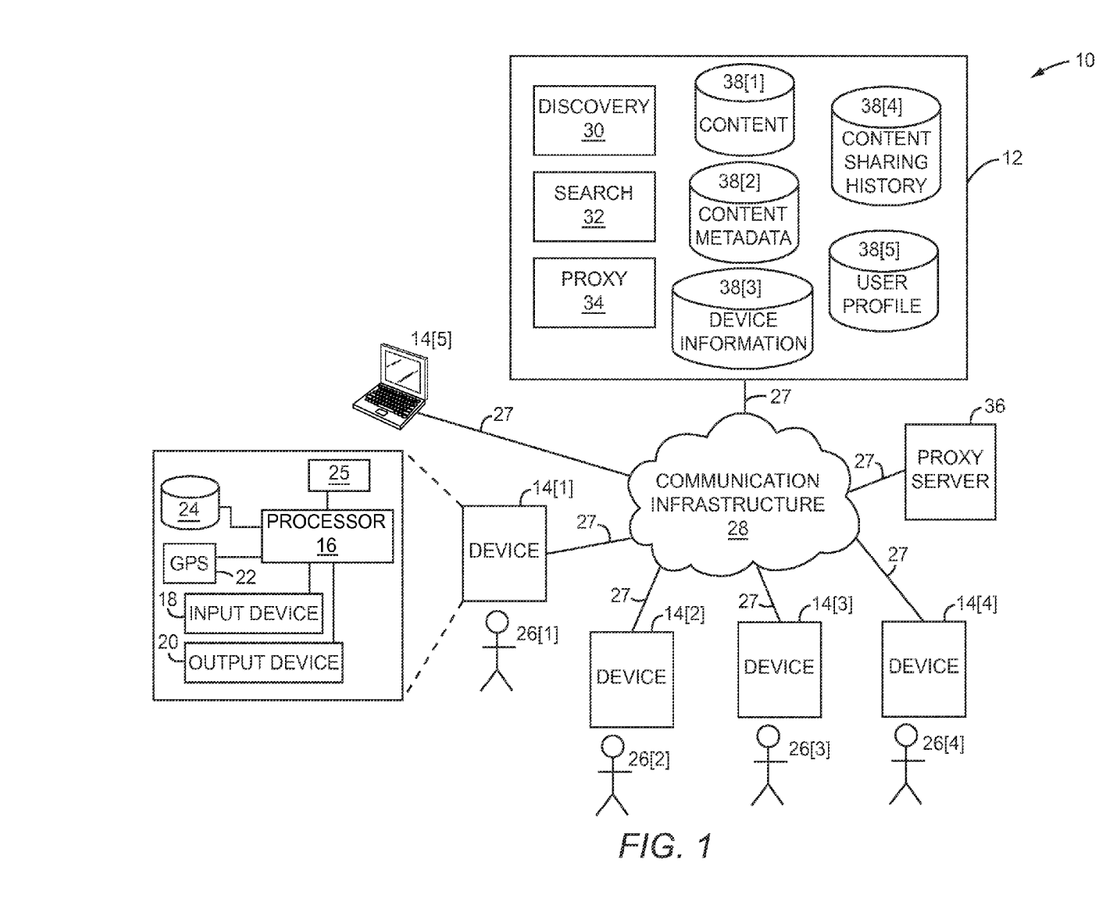
FIG. 1 illustrates a system for implementing pre-provisioning of metadata and content associated with a content sharing session according to an embodiment of the disclosure.

With reference to FIG. 1, a system 10 is illustrated for practicing exemplary and non-limiting embodiments of a CSS 12. The CSS 12 enables devices 14[1-N] to share content.

Each device 14 comprises a controller embodied as a processor 16 for performing instructions embodied in a computer readable medium. The processor 16 may include internal memory and may communicate with, for example, an input device 18, an output device 20, a Global Positioning System (GPS) device 22, a secondary storage device, such as a database 24, and a communication interface 25 via a bus (not shown) or similar mechanism. The processor 16 is a microprocessor, digital Application Specific Integrated Circuit (ASIC), Field Programmable Gate Array (FPGA), or the like. The processor 16 may receive data from, for example, the input device 18 and output data for display to a user 26 via the output device 20. The processor 16 may likewise receive location information via the GPS device 22 and may retrieve from or store data to the database 24. The device 14[1] may communicate, in either a wired or wireless fashion, with another entity including, but not limited to, another device 14 and the CSS 12. The database 24 is stored on a digital data storage device such as, for example, one or more hard disk drives. The communication interface 25 is a wired or wireless communication interface that communicatively couples the user device 14[1] to a network 27. For example, the communication interface 25 may be an Ethernet interface, local wireless interface such as a wireless interface operating according to one of the suite of IEEE 802.11 standards, or the like. The devices 14[1-N] may be mobile devices, such as a mobile phone, a PDA, a laptop computer, and the like. Alternatively, the device 14[1] may be a desktop computing device.

The CSS 12 is further communicatively coupled to the one or more devices 14[1-N] and various other entities via the network 27. The network 27 may be any type of wired network, any type of wireless network, or any combination thereof. As one example, the network 27 is a public, distributed network such as the Internet, where the devices 14[1-N] are connected to the network 27 via wired or wireless network connections. A wireless communication infrastructure 28 may be interposed between entities coupled via the network 27. While illustrated as separate entities, in accordance with exemplary embodiments, the wireless communication infrastructure 28 may comprise a part or substantially all of the network 27. The communication infrastructure 28 encompasses any and all infrastructures capable of transmitting analog or digital data, including data packets, between entities using either wired or wireless communication.

The CSS 12 includes various functional components that may be embodied in software for execution upon the processor 16. As used herein, a "component" is a logical grouping of functionality that operates to perform a desired function and that may be realized via the implementation and execution of software, hardware, or some combination of both software and hardware. A discovery component 30 operates to allow the devices 14[1-N] to announce that they are operable and available to engage in content sharing sessions. The discovery component 30 further operates to obtain network information about other devices 14. A search component 32 operates to allow mobile devices to find people, devices, and content. A proxy component 34 operates to allow the devices 14[1-N] to communicate indirectly through the proxy component 34 when the devices 14[1-N] cannot directly communicate with one another. The proxy component 34 may form a part of the CSS 12 or may be a standalone proxy server 34 in communication with the communication infrastructure 28. It is understood that the components described are exemplary and are included for schematically illustrating various functionalities of the CSS 12. In operation, more or fewer functional components may be utilized to realize the functionality of the CSS 12 as described herein. The CSS 12 can execute as a component within a wireless carrier, at a device 14, or in a peer-to-peer hybrid fashion.

The CSS 12 further comprises one or more databases 38. For example, a content database 38[1] may act as a content cache to store content and other data from a device or devices 14[1-N] associated with a user 26[1-N] such as might be shared during a content sharing session. A content metadata database 38[2] stores metadata aggregated from the content database 38[1], remote servers such a cloud storage service (not shown), home personal computers (PCs) (such as the device 14[5]), laptop computers, and the like, all of which store data associated with a user 26 of a device 14. A device information database 38[3] stores data indicative of the capabilities of the devices 14[1-N] including, but not limited to, make and model, input capabilities, output capabilities, internal storage size, transmission rates, etc. A content sharing history database 38[4] stores usage history associated with a device 14 including, but not limited to, the context in which the device 14 or a user 26 of the device 14 shared data, shared content, the devices 14 associated with a user 26 that were engaged in the process of sharing data, and the like. A user profile database 38[5] stores data associated with a user 26 including, but not limited to, demographics, social network information, and the like.

Figure 2A:
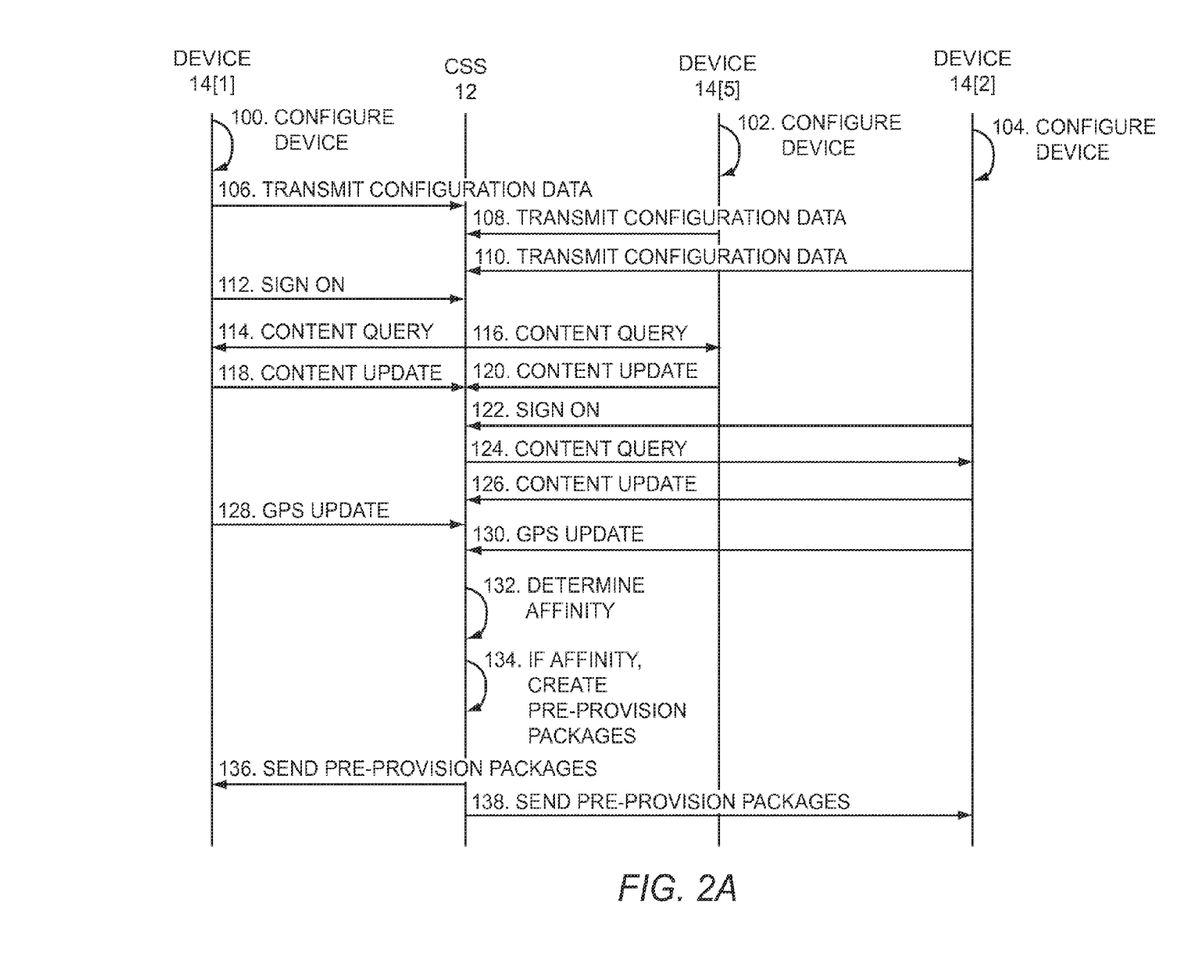
FIGS. 2A and 2B are a flowchart illustrating the flow of information between devices and a content sharing service according to an embodiment of the disclosure.
Figure 2B:
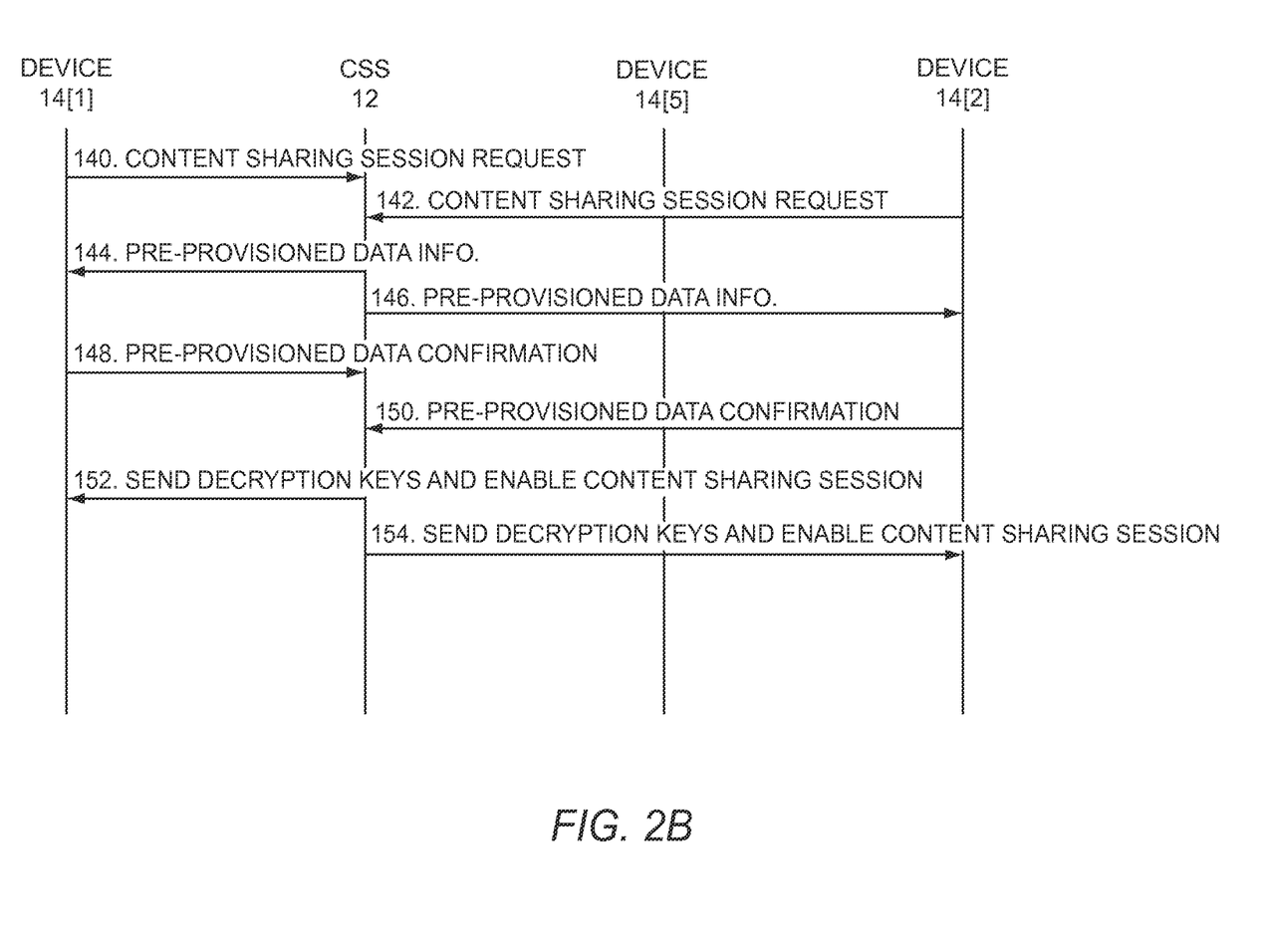

FIGS. 2A and 2B illustrate the operation of the system 10 of FIG. 1 according to an exemplary embodiment of the disclosure. As illustrated, the first device 14[1] associated with and under the control of the first user 26[1] and the second device 14[2] associated with and under the control of the second user 26[2] are each pre-provisioned in anticipation of a content sharing session via the CSS 12. In this example, the device 14[5], such as the first user's 26[1] home desktop PC, is not under the present control of the first user 26[1] but is associated with the first user 26[1] and is in communication with the CSS 12.

First, each device 14[1], 14[2], 14[5], is configured to use the CSS 12 to distribute all or a portion of their content and metadata to other mobile devices 14 before a content sharing session is established (steps 100-104). Configuration of a device 14 may be accomplished via an application executed on a processor 16 of the device 14 and utilizing an input device 18 and an output device 20 to guide the user 26 through selecting various options associated with content sharing.

As part of the configuration process, the user 26 specifies one or more provisioning rules that determine how proactive pre-provisioning is to be performed by the CSS 12. The user 26 may be provided, such as via communication with the CSS 12, a set of predefined provisioning rule templates (e.g., pre-provision all of the devices 14 associated with the user 26, all the devices 14 associated with members of the user's 26 family, the devices 14 in the user's 26 neighborhood, etc.). In an alternative embodiment, the user 26 may be provided with sample popular configurations (e.g., pre-provision near landmarks—stadium, work, college, pre-provision nearby devices 14 that have content the user 26 might be interested in, or pre-provision nearby devices 14 that are interested in content on the user's 26 device 14). Alternatively, the CSS 12 may suggest settings based on analysis of a user's 26 usage patterns (e.g., the user 26 often shares while at "work," therefore provision work related content to work devices 14 during the weekdays).

Rules specifying how to determine an affinity between more than one device 14 may be stored in a database 38[1-5] of the CSS 12. As described more fully below, when the CSS 12 determines that an appropriate affinity exists between two or more devices 14, the process of pre-provisioning the devices 14 begins. The rules may comprise, for example, Boolean computations applied to data associated with one or more users 26 and associated devices 14 that may potentially engage in a content sharing session. Such data may be stored in a database 38[1-5] of the CSS 12 or may be derived by the CSS 12 via communication with a device 14. Examples of such data include, but are not limited to, information related to a location of a user 26 and an associated device 14 (e.g., home, work, park, grocery store, airport, etc.), a user's 26 social network (e.g., relationship type, distance, profile affinity, etc.), a device 14 context (e.g., on a call, battery level, network connectivity, playing a game, etc.), time (weekend, nights, work hours, etc.), content sharing history (analysis of sharing history to determine likelihood of sharing with a particular user 26 or type of user 26, queries performed, etc.), and content metadata (name, type, annotations, tags, number of times shared/viewed, etc.).

As part of the configuration process, users 26 may grant or withhold permission for designated content data or content to be pre-provisioned to a device 14 of another user 26. Once configured, the pre-provisioning rules operate to define an affinity between two or more users 26. As used herein, "affinity" refers to a degree of likelihood that two or more devices 14 operated by two or more users 26 will desire to engage in a content sharing session. Depending on the situation, an affinity can determine whether or not pre-provisioning will commence, to what degree pre-provisioning will occur, and when pre-provisioning will take place. For example, the following pre-provisioning rules operate to determine if pre-provisioning is to take place: (1) the user 26 is at home and the candidate device 14 is associated with a person in the user's 26 family or a person that lives in the user's 26 neighborhood, (2) the user 26 is anywhere and a candidate device 14 is associated with a second user 26 with whom the user 26 is talking on the phone, calling, finished a call with, and/or scheduling a call with, (3) the user 26 is at or near work and the candidate device 14 is associated with a second user 26 associated with a calendar event of the user 26, and (4) the user 26 is at an airport and the candidate device 14 is associated with a second user 26 on the same flight. In all of the preceding examples, the CSS 12 may apply the exemplary rules to data associated with devices 14 and associated users 26 to determine if pre-provisioning is to commence.

In another example, an exemplary rule may specify that pre-provisioning is to commence if the user 26 is anywhere and moving toward a candidate device 14 and if the candidate device 14 has queried for content that matches or is related to content on the user's 26 device 14 or wherein the candidate device 14 has content similar to or related to content that the user 26 has queried, bookmarked, or in which the user 26 has otherwise indicated interest. In such a case, pre-provisioning may be enabled in a sequential fashion whereby the amount of pre-provisioned data increases as the distance between the user's 26 device 14 and the candidate device 14 decreases.

After configuration, the devices 14[1], 14[2], 14[5] transmit configuration data to the CSS 12 (steps 106-110). The configuration data may be stored, for example, in the user profile database 38[5] or the device information database 38[3]. As illustrated, the device 14[1] transmits a sign-on message to the CSS 12 informing the CSS 12 that the device 14[1] is available to engage in pre-provisioning (step 112). The transmission of the sign-on message may be triggered automatically such as by turning on a device 14, based on a device 14 location, based on a predetermined time, or in response to a manual input. In response to receiving the sign-on message, the CSS 12 sends a content query to the device 14[1] to request updated content and content metadata (step 114). In addition, the CSS 12 may determine, for example, by querying the user profile database 38[5] and the device information database 38[3] that the device 14[5] is associated with the user 26 of the device 14[1] and that the user 26 of the device 14[1] has configured both devices 14[1], 14[5] to be sources of pre-provisioning data. In response, the CSS 12 sends a content query to the device 14[5] to request updated content and content metadata (step 116).

In response to receiving the content query messages, the devices 14[1], 14[5] reply to the CSS 12 with content update messages (steps 118 and 120). The content update messages may include metadata associated with, for example, content on each of the devices 14[1], 14[5] granting permission for pre-provisioning and may be stored, for example, in the content metadata database 38[2]. In some embodiments, the content update messages may include actual content to be stored or cached, for example, in the content database 38[1]. In this manner, after the device 14[1] signs on, the CSS 12 is made aware of data residing on the devices 14[1], 14[5] that may be involved in pre-provisioning.

In the present example, the device 14[2] is activated and transmits a sign-on message to the CSS 12 informing the CSS 12 that the device 14[2] is available to engage in pre-provisioning (step 122). In response to receiving the sign-on message, the CSS 12 sends a content query to the device 14[2] to request updated content and content metadata (step 124). In response to receiving the content query message, the device 14[2] replies to the CSS 12 with a content update message (step 126). As a result, if the CSS 12 subsequently determines to pre-provision data and information between the devices 14[1], 14[5] associated with the first user 26[1] and the device 14[2], the CSS 12 has the necessary data available to perform pre-provisioning.

The devices 14[1], 14[2] optionally inform the CSS 12 of their location by sending a GPS update to the CSS 12 (steps 128 and 130). GPS location information may be determined, for example, via the GPS devices 22 forming a part of the devices 14[1], 14[2]. Such information may be utilized by the CSS 12 when determining an affinity between the two devices 14[1], 14[2] based upon physical proximity. In addition, other information may be periodically transmitted to the CSS 12 by the devices 14[1], 14[2], 14[5] and third-party services acting on behalf of a device 14 to provide contextual information, such as location, battery level, network speed, and devices in proximity, to the CSS 12. The information may be provided on a periodic basis (every 30 seconds, every ten minutes, etc.), triggered based on an event (at a certain location, moved X meters, or on a phone call), or manually triggered by the user 26 (via a refresh).

The CSS 12 continuously evaluates the contextual information by applying provisioning rules to determine an affinity sufficient to initiate a pre-provisioning process (step 132). The applied rules may be defined by the users 26[1], 26[2] and transmitted to the CSS 12, such as via the transmitted configuration data of steps 106, 108, and 110 and may be determined by the CSS 12 based, at least in part, upon data stored in, for example, the user profile database 38[5] or the content sharing history database 38[4], or may be determined based, at least in part, upon a combination of the two. In accordance with an exemplary embodiment, the CSS 12 applies rules that require simple calculations such as whether the devices 14 are within a predefined proximity to trigger the provisioning process. For example, a rule queries the device information database 38[3] to find nearby devices 14 in a certain range. The application of rules may require more complex calculations when determining affinity based on content sharing history, social network information, content sharing preferences, and the like, any or all of which may be stored in databases comprising a part of the CSS 12. For example, a rule may operate to determine a requisite affinity between devices 14 that are within 100 meters of a first user's 26[1] mobile device 14[1] if the user 26[2] associated with the device 14[2] shares content that the first user 26[1] wants such as may be determined from a user profile, a wish list, or determined by analyzing a sharing history of the first user 26[1]. The rule may also operate to cause the CSS 12 to pre-provision other mobile devices 14 if the users 26 associated with the devices 14 meet a requisite predetermined affinity in the first user's 26[1] social network or have similar user profiles.

Next, the CSS 12 packages content and content sharing metadata into pre-provision packages of data for the devices 14 that have been identified as having an affinity with one another sufficient to merit pre-provisioning (step 134). The pre-provision packages may include, but are not limited to, content metadata, device information, user information, content sharing information, collaborative viewing information, and credentials. Content metadata may include the name, the size, the type, comments about, ratings of, the author of, the Uniform Resource Locator (URL) of, license information regarding, classifications of, tags, related content references, and the like associated with content. Device information may include the type, the capabilities, the network address, a public key for protected communication, and the like for a device 14. User information may include information associated with a user 26 of the CSS 12 including, but not limited to, name, demographics, contact information, social network information, and the like. Content sharing information may include, but is not limited to, content preferences, sharing history, common/favorite queries, content groups, and the like. Collaborative viewing information may include, but is not limited to, gestures that control the operation of a device 14, such as gestures performed via an input device 18, synchronization, and the like. Credentials may include, but are not limited to, kerberos tickets, tokens, passwords, and the like.

In the present example, it is determined that the device 14[1] and the device 14[2] share an affinity sufficient to enable pre-provisioning. The CSS 12 aggregates content, content metadata, device information, user information, and any other metadata useful for a content sharing session. If necessary, the CSS 12 contacts third-party services such as cloud storage, social network services, calendar services, and so forth in order to obtain the necessary data such as via additional content query messages (not shown). The CSS 12 partitions the content, content sharing metadata, and credentials into multiple packages depending on the capabilities of the other device 14, content popularity, package delivery time, likelihood to consume, likelihood of the metadata not being out of date, location, etc. For example, the CSS 12 creates multiple packages of varying sizes: a package that contains metadata that is less likely to change (e.g., device 14 information, user profile information), a package that contains metadata for popular content/metadata for the current location, a package that contains more volatile content/metadata, and/or a package that contains content that the user 26 of the other device 14 has indicated an interest in, such as via the configuration process of steps 100, 102, and 104.

The multiple package approach may be advantageous when servicing multiple candidate devices 14. For example, the metadata package that includes device 14 and user profile information is used for multiple mobile devices 14 whereas the package that contains desired content is specific to each mobile device 14. The CSS 12 encrypts each package prior to transmission such that the receiving device 14 cannot decipher the information until it has been supplied a decryption key. Alternatively, the CSS 12 coordinates with a Digital Rights Management (DRM) service that enables secure control over the package. The rights associated with the package can include expiration, usage restrictions, can be revoked, etc.

Next, the CSS 12 sends a message to the devices 14[1], 14[2] which includes one or more pre-provision packages or references to the one or more pre-provision packages (steps 136 and 138). The CSS 12 may incrementally deliver pre-provision packages as the confidence level of a potential content sharing session increases. For example, the CSS 12 initially sends a first pre-provision package with user 26 and device 14 information. As the two devices 14[1], 14[2] get closer, the CSS 12 sends the other pre-provision packages. Incremental delivery of pre-provision package data and/or pre-provision packages in a multiple package situation may be driven by other contextual factors such as time, application startup, etc. The distance between the two devices 14[1], 14[2] can be divided into segments that represent trigger points to create and deliver pre-provision packages. Specifically, the trigger points represent geographic parameters indicating successively higher affinity levels. Pre-provision packages with less computational cost to construct are created and delivered first. For example, when the two devices 14[1], 14[2] are with 500 meters of one another, the CSS 12 is triggered to create and deliver pre-provision packages with user 26 and device 14 information. Pre-provision packages with more expensive computational cost are delayed until there is a high probability of a content sharing session. For example, when the two devices 14[1], 14[2] are within 10 meters of one another, the CSS 12 is triggered to create, package, and deliver kerberos tickets for both devices 14[1], 14[2].

As discussed above, steps 132 through 138 may be repeatedly performed based upon a determined affinity such as when the user 26[1] and the user 26[2] come into closer proximity. Additional pre-provision packages sent from the CSS 12 to either of the devices 14[1], 14[2] may be cumulative in nature and may contain little or no duplicative data contained in previous pre-provision packages. In other exemplary embodiments, pre-provision packages may include instructions to delete previously delivered pre-provision packages as might be desired if the device 14[1] moves further away from the device 14[2]. In an exemplary embodiment, pre-provision packages may include an expiration date. In general, an expiration date allows each device 14 to periodically delete, backup, or otherwise manage the status of pre-provision packages stored on the device 14. For instance, in the present example, if the device 14[1] and the device 14[2] do not enter into a content sharing session but, rather, travel away from each other and come to rest several kilometers from one another, each device 14[1], 14[2] will be pre-provisioned with pre-provision packages that are never accessed by either device 14[1], 14[2]. Because the pre-provision packages are encrypted, they are unreadable to the devices 14[1], 14[2] on which they are stored. Furthermore, as a content sharing session was never initiated, the users 26[1], 26[2] of the devices 14[1], 14[2] do not intend for the pre-provision packages to be shared. Depending on the number of times that a device 14 is pre-provisioned without engaging in a content sharing session, a device 14 may have a considerable amount of data storage space devoted to storing unreadable and undesired pre-provision packages. In such an instance it is desirable to periodically purge such pre-provision packages based upon, at least in part, an expiration date of the pre-provision packages.

In the illustrated example, the users 26[1], 26[2] of the devices 14[1], 14[2] decide to establish a content sharing session. The content sharing session may be enabled via the proxy component 34 forming a part of the CSS 12. A proxy server 36 may also be under the control of a third party and in communication with each of the devices 14[1], 14[2] via the communication infrastructure 28. The devices 14[1], 14[2] communicate with each other to establish each user's 26[1], 26[2] intention to engage in a content sharing session.

Prior to establishing the content sharing session, each device 14 desiring to take part in a content sharing session informs the CSS 12, via a content sharing session request, that the decryption keys for the pre-provisioned data on each device 14[1], 14[2] are needed (steps 140 and 142). In the exemplary illustrated embodiment, pre-provisioning of the devices 14[1], 14[2] has occurred based upon a determined affinity between the two devices 14[1], 14[2] with the CSS 12 providing no express indication to the users 26[1], 26[2] of either device 14[1], 14[2] that pre-provisioning has been occurring. As illustrated, the users 26[1], 26[2] of the devices 14[1], 14[2] decide on their own to engage in a content sharing session. Conversely, in an exemplary embodiment, the CSS 12 may inform the users 26[1], 26[2], based in part upon a determined affinity, that they may wish to engage in a content sharing session. In an alternative exemplary embodiment, while pre-provisioning is occurring, users 26 of devices 14 may be alerted and provided an opportunity to allow the continuation of the pre-provisioning or to adjust the pre-provisioning process.

In an exemplary embodiment, the CSS 12 responds to each device 14[1], 14[2] wishing to engage in a content sharing session with a pre-provisioned data information message providing each user 26[1], 26[2] with a description of each user's 26[1], 26[2] data that was pre-provisioned to the device 14 operated by the other user 26 (steps 144 and 146). For example, upon receiving a pre-provisioned data information message, the device 14[1] may display on the output device 20 a summary of all content and content related data associated with the user 26[1] of the device 14[1] that was pre-provisioned to the device 14[2]. For example, each summarized element may have an associated check box, initially checked, that the user 26[1] of the device 14[1] may uncheck to indicate that the decryption key associated with the unchecked content related data element is not to be provided to the device 14[2]. In this manner the users 26[1], 26[2] of both devices 14[1], 14[2] are able to exercise control over precisely which pre-provisioned content related data elements have permission to be shared. Each device 14[1], 14[2] responds to the CSS 12 with a pre-provisioned data confirmation message informing the CSS 12 which pre-provisioned content related elements are to be shared between the devices 14[1], 14[2] (steps 148 and 150).

In response to receiving the pre-provisioned data confirmation messages from each of the devices 14[1], 14[2], the CSS 12 responds to each device 14[1], 14[2] with a message including the decryption keys for or granting DRM rights to the pre-provisioned data residing on the devices 14[1], 14[2] (steps 152 and 154). In a non-limiting and exemplary embodiment, the CSS 12 may also operate to enable a content sharing session between the two devices 14[1], 14[2] such as via a proxy component 34 forming a part of the CSS 12. In another embodiment, each device 14[1], 14[2] may provide the decryption keys and pre-provisioned packages to a content sharing application executable on each of the devices 14[1], 14[2] to enable a content sharing session via a third party proxy server 36.

Whether managed by the CSS 12 or a third party proxy server 36, once initiated, the content sharing session between the devices 14[1], 14[2] is enhanced and accelerated as a result of the pre-provisioning of content packages prior to the commencement of the content sharing session.

In an exemplary embodiment, the CSS 12 also accepts requests for pre-provisionings from authorized third party services such as a 911 emergency system, an Amber alert system, and so forth. Depending on the third-party, the requests may override device 14 content sharing preferences, such as those transmitted with or in the configuration data, to automatically pre-provision the third party. For example, a 911 operator initiates the pre-provisioning of devices 14 in a predefined geographical area to announce an Amber alert with pre-provisioning packages including video of a missing child.

Figure 3:
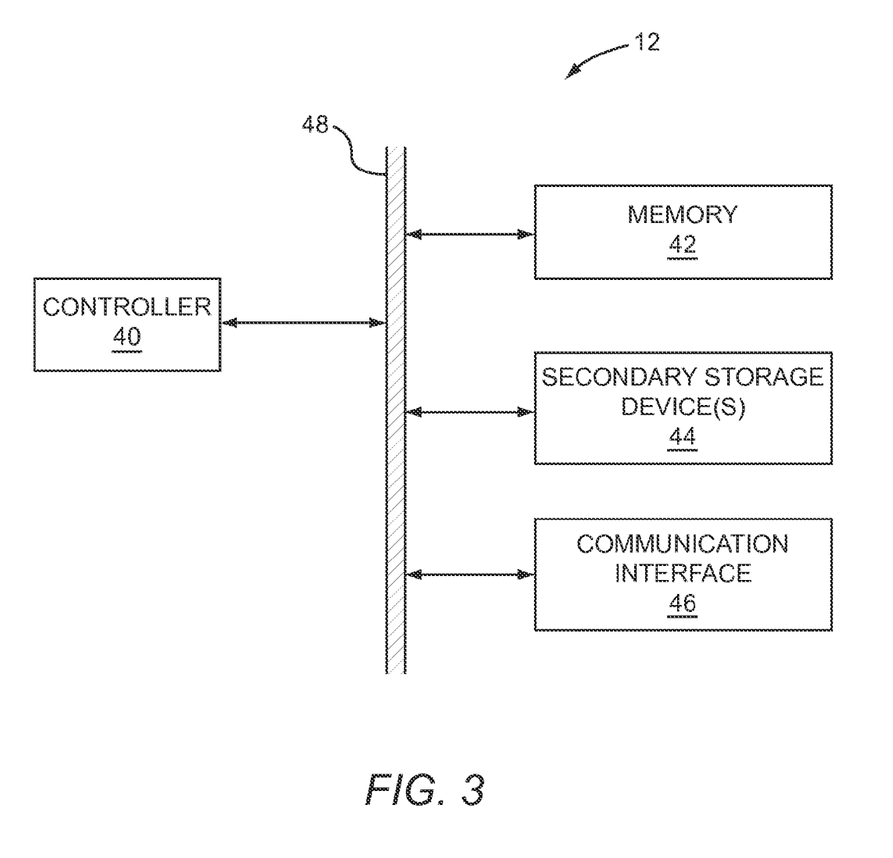
FIG. 3 is a block diagram of the CSS of FIG. 1 according to one embodiment of the present disclosure.

FIG. 3 is a block diagram of the CSS 12 of FIG. 1 according to one embodiment of the present disclosure. As illustrated, the CSS 12 includes a controller 40 connected to memory 42, one or more secondary storage devices 44, and a communication interface 46 by a bus 48 or similar mechanism. The controller 40 is a microprocessor, digital ASIC, FPGA, or the like. In this embodiment, the controller 40 is a microprocessor, and the discovery component 30, search component 32, and proxy component 34 are implemented in software and stored in the memory 42 for execution by the controller 40. Further, depending on the particular embodiment, the databases 38[1-5] are stored in the one or more secondary storage devices 44. The secondary storage devices 44 are digital data storage devices such as, for example, one or more hard disk drives. The communication interface 46 is a wired or wireless communication interface that communicatively couples the CSS 12 to the network 27 (FIG. 1). For example, the communication interface 46 may be an Ethernet interface, local wireless interface such as a wireless interface operating according to one of the suite of IEEE 802.11 standards, or the like.

Those skilled in the art will recognize improvements and modifications to the preferred embodiments of the present invention. All such improvements and modifications are considered within the scope of the concepts disclosed herein and the claims that follow.

What is claimed is:

1. A system comprising:
a computing device comprising a processor, the computing device configured to communicate with a first device and at least one other device, and further configured to perform instructions embodied in a non-transitory computer readable medium, the instructions directing the computing device to:
determine an affinity between the first device and the at least one other device;
create, based at least in part upon the determined affinity, a plurality of pre-provision packages, each comprising data stored on the first device;
determine that a distance between the first device and the at least one other device is decreasing;
prior to receiving a request from the first device to engage in a content sharing session with the at least one other device, incrementally provide ones of the plurality of pre-provision packages to the at least one other device such that additional ones of the plurality of pre-provision packages are provided to the at least one other device as the distance between the first device and the at least one other device decreases;
receive the request from the first device to engage in the content sharing session with the at least one other device; and
in response to the request, provide the at least one other device with access to the ones of the plurality of pre-provision packages stored thereupon.

2. The system of claim 1, wherein the plurality of pre-provision packages is encrypted.

3. The system of claim 2, wherein a de-encryption key is received by the system from the at least one other device.

4. The system of claim 3, wherein the de-encryption key is sent by the system to the first device.

5. The system of claim 1, wherein the first device is a mobile device.

6. The system of claim 1, wherein the at least one other device is a mobile device.

7. The system of claim 1, wherein at a distance of 1 kilometer between the first device and the at least one other device approximately 25% of the data to be pre-provisioned has been sent by the system.

8. The system of claim 1, wherein at a distance of 500 meters between the first device and the at least one other device approximately 50% of the data to be pre-provisioned has been sent by the system.

9. The system of claim 1, wherein at a distance of 100 meters between the first device and that at least one other device approximately 75% of the data to be pre-provisioned has been sent by the system.

10. A system comprising:
a content sharing service that executes in a cloud computing environment and configured to:

determine an affinity between a first device and a second device based at least in part on current location information received from the first device and the second device;

create, based at least in part upon the determined affinity, a pre-provision package comprising data stored on the first device;

provide the pre-provision package to be stored upon the second device prior to receiving a request from at least one of the first device and the second device to engage in a content sharing session with the other of the first device and the second device;

receive the request from the at least one of the first device and the second device to engage in the content sharing session with the other of the first device and the second device; and in response to the request, provide the second device with access to the pre-provision package stored thereupon.

11. The system of claim 10, wherein the location information received by the system includes a proximity of the first device and the second device.

12. The system of claim 11, wherein the system determines that the proximity of the first device and the second device is within 100 meters.

13. The system of claim 10, wherein the system receives information that the first device is a mobile device.

14. A system comprising:
at least one communication interface and at least one controller associated with the at least one communication interface and configured to:
determine an affinity between a first device and at least one other device;

create, based at least in part upon the determined affinity, a plurality of pre-provision packages, each comprising data associated with at least one of the first device and the at least one other device;

incrementally provide ones of the plurality pre-provision packages to the at least one other device such that additional ones of the plurality of pre-provision packages are provided to the at least one other device as a distance between the first device and the at least one other device decreases;

receive a request from the first device to engage in a content sharing session with the at least one other device; and in response to the request, provide the at least one of the first device and the at least one other device with access to the plurality of pre-provision packages stored thereupon.

15. The system of claim 14, wherein trigger points are geographic parameters indicating successively higher affinity between the first device and the at least one other device.

16. A system comprising:
a communication interface and a controller associated with the communication interface configured to:
determine an affinity between a first device and a second device utilizing location information received from the first device and the second device and social network information received from the first device and the second device;

create, based at least in part upon the determined affinity, a pre-provision package comprising data associated with at least one of the first device and the second device;

prior to receiving a request from either the first device or the second device to engage in a content sharing session, provide the pre-provision package to be stored upon the at least one of the first device and the second device;

receive a request from at least one of the first device and the second device to engage in the content sharing session with the other of the first device and the second device; and in response to the request, provide the at least one of the first device and the second device with access to the pre-provision package stored thereupon.

17. The system of claim 16, wherein the controller is further directed to apply at least one rule associated with the first device to determine the affinity.

18. The system of claim 17, wherein the at least one rule is time-dependent.

19. The system of claim 17, wherein the at least one rule is time- and location-dependent.

20. The system of claim 16, wherein the controller is configured to find the first device.

21. The system of claim 16, wherein the first device and the second device can communicate through the system when the first device and the second device cannot directly communicate.

22. The system of claim 16, wherein the controller is further directed to suggest settings to the first device based on an analysis of the first device's usage patterns.

23. The system of claim 16, wherein the pre-provision package includes information related to a location of the first device.

24. The system of claim 16, wherein the pre-provision package includes information related to a social network of the first device.

25. The system of claim 16, wherein the controller is further directed to request permission from the first device for pre-provisioning.

* * * * *